(12) United States Patent
Niwa et al.

(10) Patent No.: US 6,454,364 B1
(45) Date of Patent: Sep. 24, 2002

(54) BRAKING FORCE CONTROL APPARATUS AND METHOD OF MOTOR VEHICLE

(75) Inventors: Satoru Niwa, Susono (JP); Michihito Shimada, Susono (JP); Junichi Sakamoto, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/928,379

(22) Filed: Aug. 14, 2001

(30) Foreign Application Priority Data

Sep. 14, 2000 (JP) .......................... 2000-280516

(51) Int. Cl.[7] .................. B60T 8/66; B60T 8/64
(52) U.S. Cl. .................. 303/152; 303/3; 303/186
(58) Field of Search ............... 303/152, 186, 303/187, 188, 189, 20, 3; 188/156, 158, 159, 181 T, 349; 701/70, 22, 108; 180/165, 65.1–65.8; 318/371

(56) References Cited

U.S. PATENT DOCUMENTS

| 5,148,883 A | 9/1992 | Tanaka et al. |
|---|---|---|
| 5,253,929 A | 10/1993 | Ohori |
| 5,549,172 A | 8/1996 | Mutoh et al. |
| 5,615,933 A | 4/1997 | Kidston et al. |
| 5,757,153 A | 5/1998 | Ito et al. |
| 5,853,229 A | 12/1998 | Willmann et al. |
| 5,895,100 A | 4/1999 | Ito et al. |
| 6,099,089 A | 8/2000 | Schneider |
| 2002/0030405 A1 * | 3/2002 | Niwa et al. ............. 303/152 |
| 2002/0030408 A1 | 3/2002 | Niwa et al. ............. 303/152 |
| 2002/0036429 A1 * | 3/2002 | Shimada et al. ......... 303/152 |

FOREIGN PATENT DOCUMENTS

| JP | 9-93711 A | 4/1997 |
|---|---|---|
| JP | 169405 | * 6/2001 |

* cited by examiner

Primary Examiner—Douglas C. Butler
(74) Attorney, Agent, or Firm—Oliff & Berridge PLC

(57) ABSTRACT

A braking force control apparatus and method control a braking force of a motor vehicle that has (a) regenerative braking devices for front wheels and rear wheels, respectively, and (b) a friction braking device for each of the front wheels and the rear wheels. A target braking force of the front wheels and a target braking force of the rear wheels are calculated, based on a braking requirement made by a driver of the vehicle and a ratio of braking forces of the front wheels and the rear wheels. Initially, the regenerative braking devices are controlled to generate regenerative braking forces at the front wheels and the rear wheels, and then, if necessary, the friction braking device is controlled to generate a friction braking force at each of the front wheels and rear wheels, so that a total braking force applied to the front wheels and a total braking force applied to the rear wheels are controlled to the front-wheel target braking force and the rear-wheel target braking force, respectively.

24 Claims, 5 Drawing Sheets

BRAKING FORCE CONTROL APPARATUS AND METHOD OF MOTOR VEHICLE

INCORPORATION BY REFERENCE

The disclosure of Japanese Patent Application No. 2000-280516 filed on Sep. 14, 2000 including the specification, drawings and abstract is incorporated herein by reference in its entirety.

BACKGROUND OF THE INVENTION

1. Field of Invention

The invention relates generally to a braking force control apparatus and method of a motor vehicle, and more particularly to a braking force control apparatus and method of a motor vehicle including regenerative braking devices and a friction braking device for front wheels and rear wheels of the vehicle.

2. Description of Related Art

A known type of a braking force control apparatus of a motor vehicle, such as an automobile, is disclosed in, for example, Japanese Laid-open Patent Publication No. 9-93711. In the known braking force control apparatus, driven wheels are provided with a hydraulic braking device (i.e., a friction braking device), and drive wheels are provided with a regenerative braking device and a hydraulic braking device. In operation, when the regenerative braking force of the drive wheels reaches a predetermined value that is equal to or smaller than a maximum value, the regenerative braking force is kept at the predetermined value, and hydraulic braking of the driven wheels is started. With the driven wheels being hydraulically braked, the regenerative braking force applied to the drive wheels is kept at the predetermined value, until the ratio of the braking forces of the driven wheels and drive wheels becomes equal to a predetermined ratio.

The braking force control apparatus as described above makes it possible to suitably control the ratio of the braking forces of the driven wheels and drive wheels to the predetermined ratio, while performing regenerative braking of the drive wheels so that the regenerative braking force applied to the drive wheels becomes equal to the predetermined value, which in turn is equal to or smaller than the maximum value.

In the known braking force control apparatus as described above, hydraulic braking of the driven wheels is started when the regenerative braking force of the drive wheels reaches the predetermined value, and the regenerative braking force is kept at the predetermined value until the ratio of the braking forces of the driven wheels and drive wheels becomes equal to the predetermined ratio. With this type of the braking force control apparatus, however, the regeneration efficiency of the regenerative braking device cannot be maximized. To the contrary, if an attempt is made to maximize the regeneration efficiency of the regenerative braking device, the ratio of the braking forces of the driven wheels and the drive wheels cannot be controlled to the predetermined ratio.

In addition, the driven wheels of the vehicle that employs the braking force control apparatus disclosed in the above-mentioned publication are not provided with a regenerative braking device, and therefore regenerative braking is not effected, namely, electric energy is not recovered during braking of the driven wheels. Thus, the known braking force control apparatus cannot increase the regeneration efficiency of the vehicle as a whole by utilizing regenerative braking of the driven wheels, thus leaving a room for improvement in this respect.

SUMMARY OF THE INVENTION

It is therefore one object of the invention to provide a braking force control apparatus and method of a motor vehicle having regenerative braking devices and a friction braking device for front wheels and rear wheels, wherein the regenerative braking devices and the friction braking device for the front and rear wheels are optimally operated under suitable control, thus assuring an improved regeneration efficiency of the vehicle as a whole, while achieving a predetermined ratio of the braking forces of the front and rear wheels.

To accomplish the above and/or other objects, there is provided a braking force control apparatus and method of a motor vehicle including (a) first and second regenerative braking devices that are operable to effect regenerative braking with respect to front wheels and rear wheels, respectively, and (b) a friction braking device that is operable to effect friction braking with respect to each of the front wheels and the rear wheels. A controller of the braking force control apparatus calculates a first target braking force of the front wheels and a second target braking force of the rear wheels, based on a braking requirement made by a driver of the vehicle and a ratio of braking forces of the front wheels and the rear wheels. The controller initially causes the first and second regenerative braking devices to generate regenerative braking forces at the front wheels and the rear wheels, and then, if necessary, causes the friction braking device to generate a friction braking force at each of the front wheels and rear wheels, so that a total braking force applied to the front wheels and a total braking force applied to the rear wheels are controlled to the first target braking force and the second target braking force, respectively.

With the braking force control apparatus and method as described above, the overall braking force of the motor vehicle is suitably controlled in accordance with the braking requirement made by the driver or vehicle operator, and the ratio of the braking forces of the front and rear wheels is also suitably controlled to a predetermined braking-force ratio. Furthermore, the regenerative braking devices and friction control device for the front wheels and the rear wheels can be optimally operated, thus assuring an improved regeneration efficiency of the vehicle as a whole and significantly improved fuel economy, as compared with conventional braking devices controlled by a conventional braking force control apparatus.

BRIEF DESCRIPTION OF THE DRAWINGS

The foregoing and/or further objects, features and advantages of the invention will become more apparent from the following description of a preferred embodiment with reference to the accompanying drawings, in which like numerals are used to represent like elements and wherein.

DETAILED DESCRIPTION OF PREFERRED EMBODIMENTS

A preferred embodiment of the invention will be described in detail with reference to the accompanying drawings.

Figure 1:
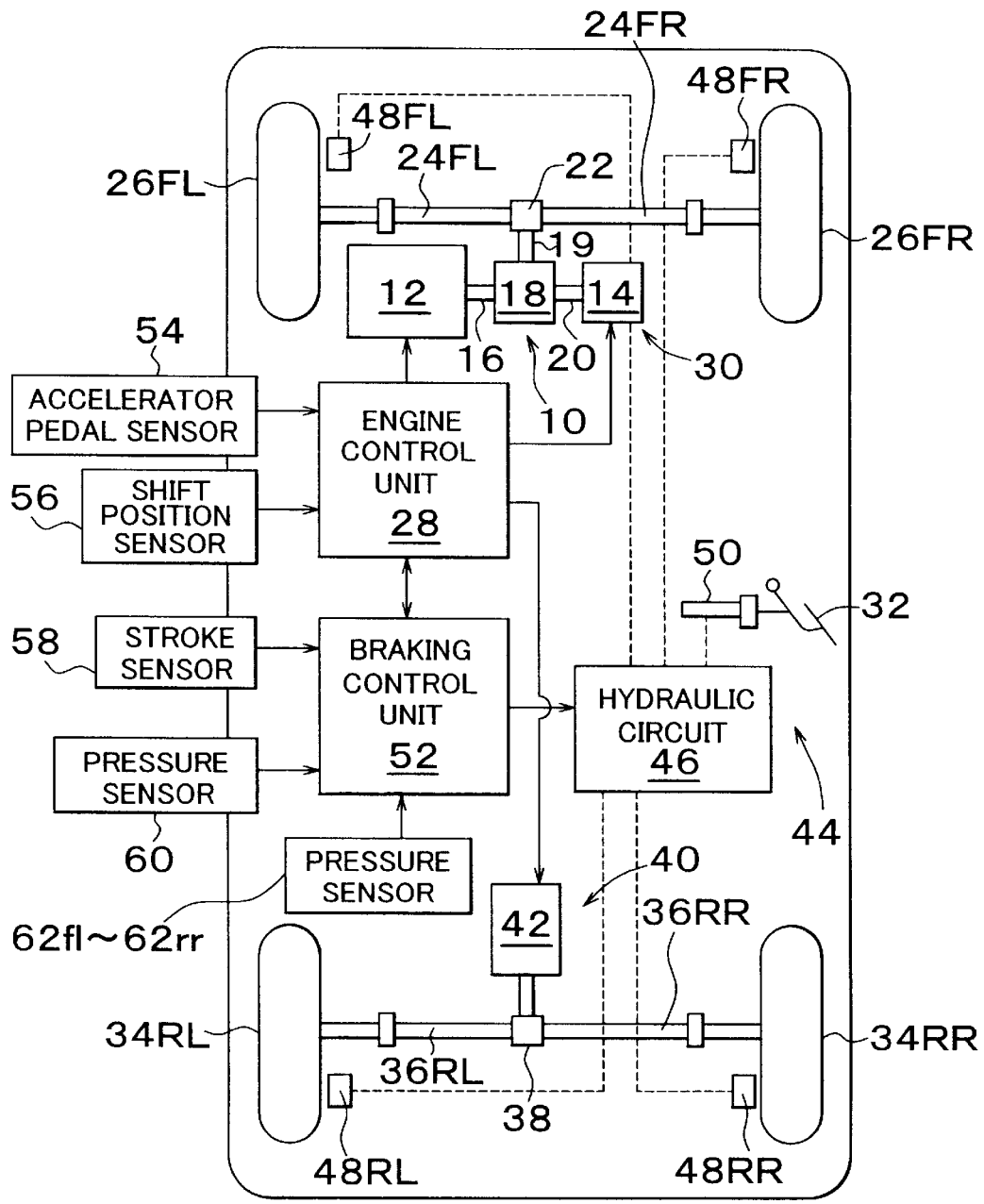
FIG. 1 is a diagram schematically showing the construction of a front-wheel-drive vehicle in which a hybrid-type drive-train is installed, which vehicle includes one embodiment of a braking force control apparatus of the invention.

FIG. 1 schematically shows the construction of a braking force control apparatus according to one embodiment of the invention, which apparatus is employed in a front-wheel-drive vehicle in which a hybrid-type drive-train is installed.

In FIG. 1, a hybrid-type drive-train 10 that drives front wheels includes a gasoline engine 12 and a motor/generator 14. A continuously variable transmission 18 that incorporates a clutch has an input shaft that is coupled to an output shaft 16 of the gasoline engine 12 and is also coupled to an output shaft 20 of the motor/generator 14. Rotary motion of the output shaft 19 of the continuously variable transmission 18 is transmitted to axles 24FL and 24FR of left and right front wheels via a front-wheel differential 22, so as to drive and rotate left and right front wheels 26FL and 26FR.

The gasoline engine 12 and the motor/generator 14 of the hybrid drive-train 10 are controlled by an engine control unit 28, depending upon an operating amount of an accelerator pedal (not shown) by the driver and running conditions of the vehicle, for example. The motor/generator 14 also functions as a generator of a regenerative braking device 30 for front wheels. The engine control unit 28 controls the motor/generator 14 when it functions as a regenerative generator for recovering electric energy during regenerative braking.

In the embodiment as shown in FIG. 1, in particular, the hybrid drive-train 10 is operable in a selected one of operating modes including a normal driving mode, an electric vehicle mode, and an engine brake mode. When a shift lever (not shown) is placed in a D (Drive) range during normal running of the vehicle, the hybrid drive-train 10 operates in the normal driving mode in which driving force or engine brake force is generated by the gasoline engine 12 or by both the gasoline engine 12 and the motor/generator 14. When the shift lever is placed in the D range but the load is low, the hybrid drive-train 10 operates in the electric vehicle mode in which driving force is generated solely by the motor/generator 14. When the shift lever is placed in a B range, the hybrid drive-train 10 operates in the engine brake mode in which driving force or engine brake force is generated by the gasoline engine 12 and the motor/generator 14, such that the engine brake force generated in this mode is greater than that generated when the shift lever is placed in the D range. When the shift lever is placed in the D range and a brake pedal 32 is depressed by the driver, the motor/generator 14 functions as the regenerative generator as mentioned above.

In FIG. 1, rotary motion of left and right rear wheels 34RL and 34RR, serving as driven wheels, is transmitted to a motor/generator 42 of a regenerative braking device 40 for rear wheels, via axles 36RL and 36RR of left and right rear wheels and a rear-wheel differential 38. The engine control unit 28 as indicated above is also operable to control regenerative braking effected by the motor/generator 42.

Thus, the engine control unit 28 functions as a regenerative braking control unit for controlling the regenerative braking devices 30, 40.

A hydraulic circuit 46 of a friction braking device 44 is operable to control braking pressures applied to wheel cylinders 48FL, 48FR, 48RL and 48RR corresponding to the left and right front wheels 26FL, 26FR and left and right rear wheels 34RL, 34RR so as to control friction braking forces of the respective wheels 26FL, 26FR, 34RL, 34RR. Although not shown in the drawings, the hydraulic circuit 46 includes a reservoir, an oil pump, and various valve devices. The friction braking device 44 including the hydraulic circuit 46 is controlled by a braking control unit 52. During normal operations, the braking pressures applied to the respective wheel cylinders are controlled by the braking control unit 52, depending upon the pressure of a master cylinder 50 that is driven in accordance with the amount or degree of depression of the brake pedal 32 by the driver.

The engine control unit 28 receives, from an accelerator pedal sensor 54, a signal indicative of an amount of depression of the accelerator pedal, and receives, from a shift position sensor 56, a signal indicative of a current shift position of the continuously variable transmission 18. The engine control unit 28 further receives, from the braking control unit 52, a signal indicative of a target regenerative braking force Frgft of front wheels and a signal indicative of a target regenerative braking force Frgrt of rear wheels.

The braking control unit 52 receives a signal indicative of a depression stroke Sp of the brake pedal 32 from a stroke sensor 58, and receives a signal indicative of a pressure Pm of the master cylinder 50 from a pressure sensor 60. The braking control unit 52 further receives, from pressure sensors 62fl, 62fr, 62rl, 62rr, signals indicative of braking pressures Pfl, Pfr, Prl, Prr applied to the wheel cylinders 48FL, 48FR, 48RL, 48RR of the left and right front wheels and left and right rear wheels.

Each of the engine control unit 28 and the braking control unit 52 may have a general configuration or arrangement that includes a microcomputer including CPU, ROM, RAM, input and output devices, and a drive circuit.

Figure 2:
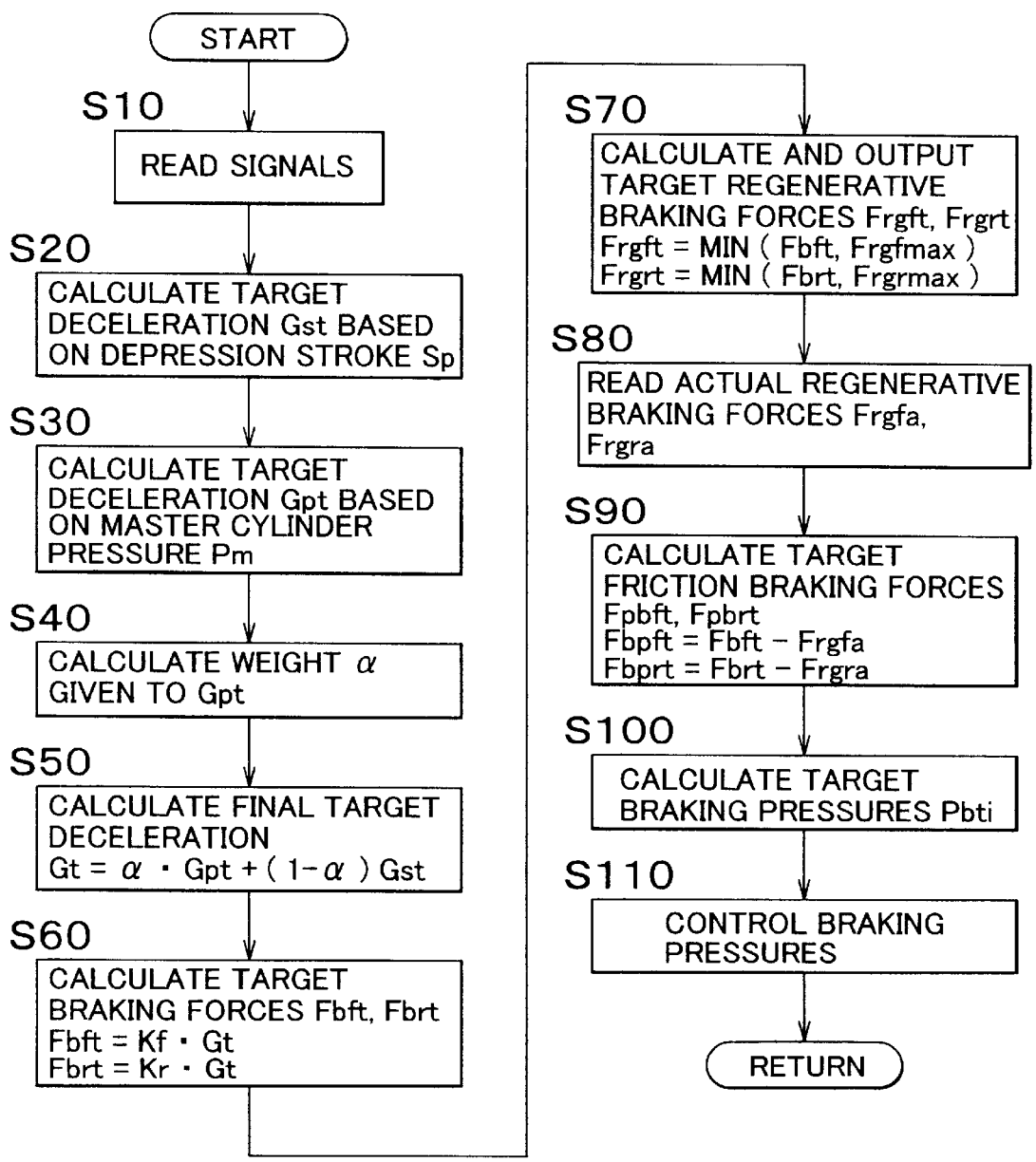
FIG. 2 is a flowchart illustrating a braking force control routine executed by a braking control unit of the embodiment of FIG. 1.

As will be described in detail, the braking control unit 52 calculates a final target deceleration Gt of the vehicle that represents a braking requirement made by the driver, based on the stroke Sp of depression of the brake pedal 32 and the master cylinder pressure Pm, according to a routine as illustrated in FIG. 2. The braking requirement means a braking amount or degree that is requested or desired by the driver. The braking control unit 52 then calculates target braking forces Fbft and Fbrt for the front wheels and the rear wheels, respectively, based on the final target deceleration Gt and a predetermined ratio of the braking forces distributed to the front wheels and the rear wheels, respectively. Where Frgfmax and Frgrmax represent the maximum regenerative braking forces that can be generated by the regenerative braking devices 30 and 40, respectively, the braking control unit 52 employs the smaller one of the target braking force Fbft and the maximum regenerative braking force Frgfmax as a target regenerative braking force Frgft for the front wheels, and employs the smaller one of the target braking force Fbrt and the maximum regenerative braking force Frgrmax as a target regenerative braking force Frgrt for the rear wheels. The braking control unit 52 then outputs or transmits signals indicative of the front-wheel and rear-wheel target regenerative braking forces Frgft and Frgrt to the engine control unit 28.

The engine control unit 28 controls the motor/generator 14 of the front-wheel regenerative braking device 30, using the front-wheel target regenerative braking force Frgft as an upper limit thereof, and calculates the actual regenerative braking force Frgfa actually generated by the front-wheel regenerative braking device 30, based on voltage and current generated by the motor/generator 14. Similarly, the engine control unit 28 controls the motor/generator 42 of the rear-wheel regenerative braking device 40, using the rear-wheel target regenerative braking force Frgrt as an upper limit thereof, and calculates the actual regenerative braking force Frgra actually generated by the rear-wheel regenerative braking device 40, based on voltage and current generated by the motor/generator 42. The engine control unit 28 then outputs signals indicative of the actual regenerative braking forces Frgfa and Frgra, to the braking control unit 52.

Subsequently, the braking control unit 52 sets a target friction braking force Fbpft of the front wheels to a value obtained by subtracting the front-wheel actual regenerative braking force Frgfa from the front-wheel target braking force Fbft, and sets a target friction braking force Fbprt of the rear wheels to a value obtained by subtracting the rear-wheel actual regenerative braking force Frgra from the rear-wheel target braking force Fbrt. The braking control unit 52 then calculates target braking pressures Pbtfl and Pbtfr applied to the left and right front wheels, based on the front-wheel target friction braking force Fbpft, and calculates target braking pressures Pbtrl and Pbtrr applied to the left and right rear wheels, based on the rear-wheel target friction braking force Fbprt. The braking control unit 52 then controls the braking pressure of each wheel so that the braking pressures Pi (i=fl, fr, rl, rr) of left and right front wheels and left and right rear wheels become equal to the target braking pressures Pbti (i=fl, fr, rl, rr) of the corresponding wheels.

It is to be understood that the engine control unit 28 may control the operating mode of the hybrid drive-train 10 and the gasoline engine 12 in different known manners from those of the illustrated embodiment, since these controls do not constitute the principle of the invention.

Next, a braking force control routine to be executed by the braking control unit 52 of the present embodiment will be explained with reference to the flowchart as shown in FIG. 2. The control according to the flowchart of FIG. 2 is started upon closing of an ignition switch (not shown), and is repeatedly executed at predetermined time intervals.

Figure 4:
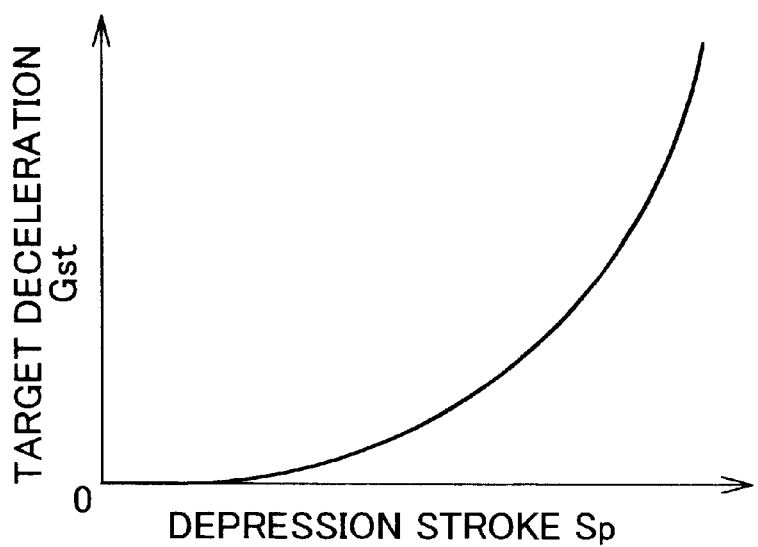
FIG. 4 is a graph showing the relationship between the depression stroke Sp of the brake pedal and the target deceleration Gst.
Figure 5:
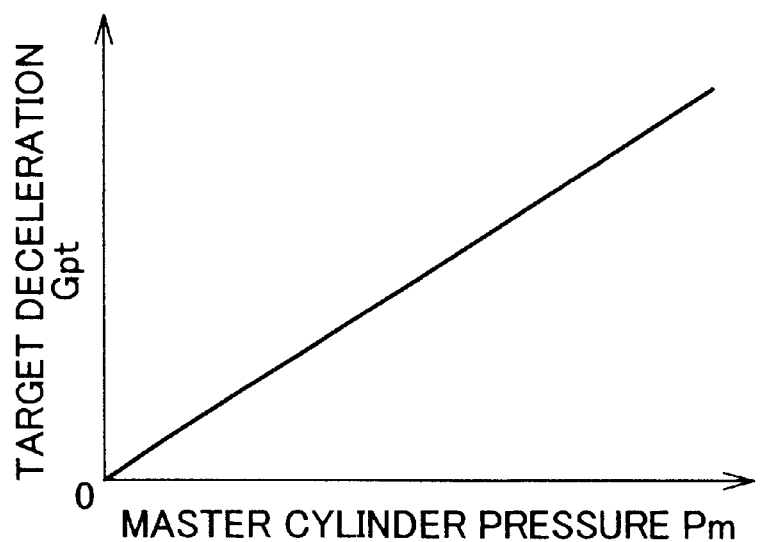
FIG. 5 is a graph showing the relationship between the master cylinder pressure Pm and the target deceleration Gpt.

In step S10, the braking control unit 52 reads a signal indicative of a depression stroke Sp of the brake pedal 32 detected by the stroke sensor 58, and a signal indicative of a pressure Pm of the master cylinder 50 detected by the pressure sensor 60. In step S20, a target deceleration Gst is calculated based on the brake-pedal depression stroke Sp, using a map corresponding to the graph as shown in FIG. 4. In step S30, a target deceleration Gpt is calculated based on the master cylinder pressure Pm, using a map corresponding to the graph as shown in FIG. 5.

Figure 6:
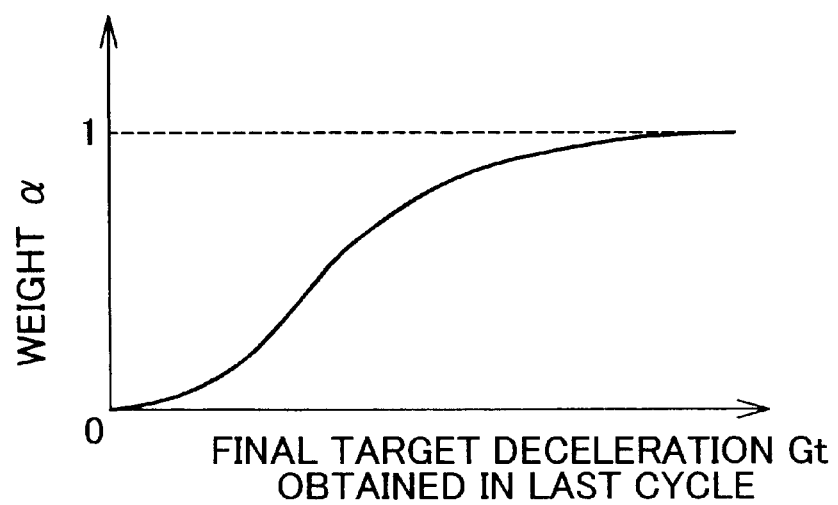
FIG. 6 is a graph showing the relationship between the final target deceleration Gt obtained in the last control cycle and the weight a given to the target deceleration Gpt.

In step S40, a weight $\alpha$ ($0 \leq \alpha \leq 1$) that is given to the target deceleration Gpt based on the master cylinder pressure Pm is calculated, on the basis of the final target deceleration Gt obtained in the last control cycle, using a map corresponding to the graph as shown in FIG. 6. In step S50, the final target deceleration Gt is calculated as a sum of the weighted target deceleration Gpt and the weighted target deceleration Gst, according to the following equation (1):

$$Gt = \alpha \cdot Gpt + (1-\alpha)Gst \quad (1)$$

In step S60, the target braking force Fbft for the front wheels and the target braking force Fbrt for the rear wheels are calculated according to the following equations (2) and (3), where Kf and Kr are positive constants that represent the proportions of the braking force applied to the front wheels and the braking force applied to the rear wheels.

$$Fbft = Kf \cdot Gt \quad (2)$$

$$Fbrt = Kr \cdot Gt \quad (3)$$

In step S70, the target regenerative braking force Frgft for the front wheels and the target regenerative braking force Frgrt for the rear wheels are calculated according to the expressions (4) and (5) indicated below, and signals indicative of the target regenerative braking forces Frgft and Frgrt thus obtained are transmitted to the engine control unit 28. In the expressions (4) and (5) as indicated below, MIN means an operation to select the smaller one of numerical values in the parentheses ( ). While the maximum regenerative braking forces Frgfmax and Frgrmax are determined as positive constants in the present embodiment, these braking forces may be varied depending upon the operating mode of the hybrid drive-train 10 and the vehicle speed.

$$Frgft = \text{MIN}(Fbft, Frgf\text{max}) \quad (4)$$

$$Frgrt = \text{MIN}(Fbrt, Frgr\text{max}) \quad (5)$$

In step S80, the braking control unit 52 reads, from the engine control unit 28, signals indicative of the actual front-wheel regenerative braking force Frgfa and actual rear-wheel regenerative braking force Frgra that have been achieved through regenerative braking control performed by the engine control unit 28 as described later with reference to FIG. 3. In step S90, the target front-wheel friction braking force Fbpft and the target rear-wheel friction braking force Fbprt are calculated according to the following equations (6) and (7):

$$Fbpft = Fbft - Frgfa \quad (6)$$

$$Fbprt = Fbrt - Frgra \quad (7)$$

In step S100, the target braking pressures Pbtfl and Pbtfr applied to the left and right front wheels are calculated based on the target front-wheel friction braking force Fbpft, and the target braking pressures Pbtrl and Pbtrr applied to the left and right rear wheels are calculated based on the target rear-wheel friction braking force Fbprt. In step S110, the braking pressure of each wheel is controlled in a feedback manner so that the braking pressures Pi of the left and right front wheels and left and right rear wheels become equal to the respective target braking pressures Pbti of the corresponding wheels. After executing step S110, control returns to step S10.

Figure 3:
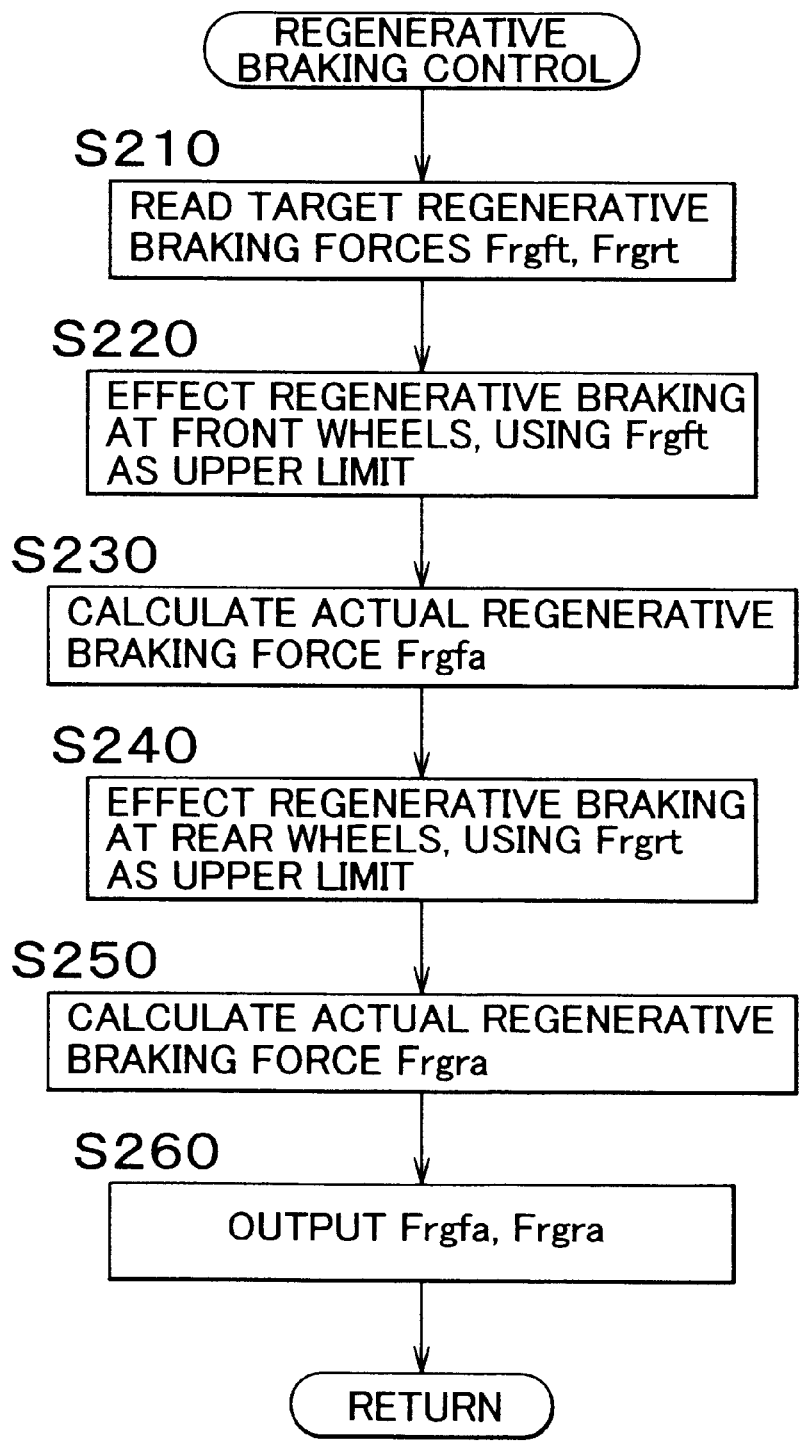
FIG. 3 is a flowchart illustrating a regenerative braking control routine executed by an engine control unit of the embodiment of FIG. 1.

Referring next to the flowchart as shown in FIG. 3, a regenerative braking control routine to be executed by the engine control unit 28 in the present embodiment will be now explained. The control according to the flowchart of FIG. 3 is also started upon closing of the ignition switch (not shown), and is repeatedly executed at predetermined time intervals.

In step S210, the engine control unit 28 reads, from the braking control unit 52, signals indicative of the target regenerative braking force Frgft for the front wheels and the target regenerative braking force Frgrt for the rear wheels. In step S220, the engine control unit 28 causes the front-wheel regenerative braking device 30 to effectuate regenerative braking, using the target regenerative braking force Frgft as an upper limit thereof. In step S230, the actual regenerative braking force Frgfa actually applied to the front wheels by the front-wheel regenerative braking device 30 is calculated.

Similarly, in step S240, the engine control unit 28 causes the rear-wheel regenerative braking device 40 to effectuate regenerative braking, using the target regenerative braking force Frgrt as an upper limit thereof. In step S250, the actual regenerative braking force Frgra actually applied to the rear wheels by the rear-wheel regenerative braking device 40 is calculated. In step S260, signals indicative of the actual front-wheel regenerative braking force Frgfa and the actual rear-wheel regenerative braking force Frgra are transmitted to the braking control unit 52. After executing step S260, control returns to step S210.

In the embodiment as described above, the target deceleration Gst is calculated in step S20 based on the depression stroke Sp of the brake pedal 32, and the target deceleration Gpt is calculated in step S30 based on the master cylinder pressure Pm. In step S40, the weight a given to the target deceleration Gpt is calculated based on the final target deceleration Gt obtained in the last control cycle.

Subsequently, the final target deceleration Gt is calculated in step S40 as a sum of the weighted target deceleration Gpt and the weighted target deceleration Gst, and the target front-wheel braking force Fbft and the target rear-wheel braking force Fbrt are calculated in step S60 based on the predetermined ratio of the front-wheel and rear-wheel braking forces and the final target deceleration Gt. In step S70, the target front-wheel regenerative braking force Frgft is obtained as the smaller one of the target braking force Fbft and the maximum front-wheel regenerative braking force Frgfmax, and the target rear-wheel regenerative braking force Frgrt is obtained as the smaller one of the target braking force Fbrt and the maximum rear-wheel regenerative braking force Frgrmax. Then, signals indicative of the target regenerative braking forces are transmitted to the engine control unit 28.

In step S220 of the regenerative braking routine as shown in FIG. 3, the engine control unit 28 controls the motor/generator 14 of the front-wheel regenerative braking device 30, using the target front-wheel regenerative braking force Frgft as an upper limit thereof. In the next step S230, the actual regenerative braking force Frgfa generated by the front-wheel regenerative braking device 30 is calculated based on voltage and current generated by the motor/generator 14. In step S240, the engine control unit 28 controls the motor/generator 42 of the rear-wheel regenerative braking device 40, using the rear-wheel target regenerative braking force Frgrt as an upper limit thereof. In the next step S250, the actual regenerative braking force Frgra generated by the rear-wheel regenerative braking device 40 is calculated based on voltage and current generated by the motor/generator 42.

Turning to the flowchart of FIG. 2, the front-wheel target friction braking force Fbpft is calculated in step S90 by subtracting the actual regenerative braking force Frgfa from the target regenerating force Fbft, and the rear-wheel target friction braking force Fbprt is calculated in step S90 by subtracting the actual regenerative braking force Frgra from the target braking force Fbrt. In step S100, the target braking pressures Pbtfl and Pbtfr applied to the left and right front wheels are calculated based on the target front-wheel friction braking force Fbpft, and the target braking pressures Pbtrl and Pbtrr applied to the left and right rear wheels are calculated based on the target rear-wheel friction braking force Fbprt. In step S110, the braking pressure of each wheel is controlled in a feedback manner so that the braking pressures Pi of the left and right front wheels and left and right rear wheels become equal to the target braking pressures Pbti of the corresponding wheels.

Thus, in the illustrated embodiment, the final target deceleration Gt that represents a braking requirement made by the driver is calculated based on the pedal stroke Sp as an operating amount of the brake pedal 32 and the master cylinder pressure Pm, and the braking force of the vehicle as a whole, namely, the sum of the braking forces applied to the front and rear wheels by the friction braking device and the regenerative braking devices, is controlled to a value corresponding to the final target deceleration Gt. Thus, the braking force of the vehicle as a whole can be reliably controlled in accordance with the braking requirement made by the driver.

In the illustrated embodiment, the ratio of the total braking force applied to the front wheels by the friction braking device and the regenerative braking device to the total braking force applied to the rear wheels by the friction braking device and the regenerative braking device is always controlled to be equal to the predetermined braking-force ratio, Kf/Kr. Thus, the ratio of the braking forces distributed to the front and rear wheels can be surely controlled to the predetermined braking-force ratio, irrespective of the proportion of the braking force generated by the friction braking device and the braking force generated by the regenerative braking device. It is thus possible to certainly avoid deterioration of the stability of the vehicle and changes in steering characteristics, which would otherwise occur when the ratio of the braking forces applied to the front and rear wheels differs from the predetermined ratio.

Furthermore, the target front-wheel braking force Fbft is achieved or realized by controlling the regenerative braking force and friction braking force of the front wheels such that the front-wheel regenerative braking device provides the maximum regenerative braking force. Similarly, the target rear-wheel braking force Fbrt is achieved by controlling the regenerative braking force and friction braking force of the rear wheels such that the rear-wheel regenerative braking device provides the maximum regenerative braking force. Thus, the regenerative braking force and friction braking force can be controlled so that the regeneration efficiency of the vehicle as a whole is maximized while at the same time the ratio of the braking forces distributed to the front wheels and the rear wheels is kept at the predetermined braking-force ratio.

In general, even if a regenerative braking device, in particular, a regenerative braking device having a motor/generator mounted in a hybrid drive-train, is controlled so as to provide a target regenerative braking force, the actual regenerative braking force actually generated by the regenerative braking device does not coincide with, but becomes smaller than the target regeneration braking force because of various restrictions.

In the illustrated embodiment, the engine control unit 28 controls the motor/generator 14 of the front-wheel regenerative braking device 30 and the motor/generator 42 of the rear-wheel regenerative braking device 40, using the target front-wheel regenerative braking force Frgft and target rear-wheel regenerative braking force Frgrt as the upper limits of the respective braking forces. The engine control unit 28 then calculates the actual regenerative braking forces Frgfa, Frgra of the front and rear wheels, based on the voltage and current generated by the respective motor/generators, and calculates the target front-wheel friction braking force Fbpft and the target rear-wheel friction braking force Fbprt by subtracting the actual regenerative braking forces Frgfa, Frgra from the target braking forces Fbft, Fbrt, respectively. Accordingly, the friction braking forces applied to the front wheels and rear wheels can be controlled with improved accuracy so that the braking force of the vehicle as a whole precisely corresponds to the braking requirement made by the driver, as compared with the case where the target front-wheel friction braking force Fbpft and target rear-wheel friction braking force Fbprt are calculated by subtracting the target regenerative braking forces Frgft, Frgrt from the target braking forces Fbft, Fbrt, respectively.

While the invention has been described with reference to a preferred embodiment thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

In the illustrated embodiment, the target deceleration Gt is calculated based on the depression stroke Sp of the brake pedal 32 and the master cylinder pressure Pm, and the front-wheel target braking force Fbft and the rear-wheel target braking force Fbrt are calculated based on the target deceleration Gt. However, the target braking forces Fbft, Fbrt of the front and rear wheels may be calculated based on the depression stroke Sp of the brake pedal 32 or the master cylinder Pm.

Figure 7:
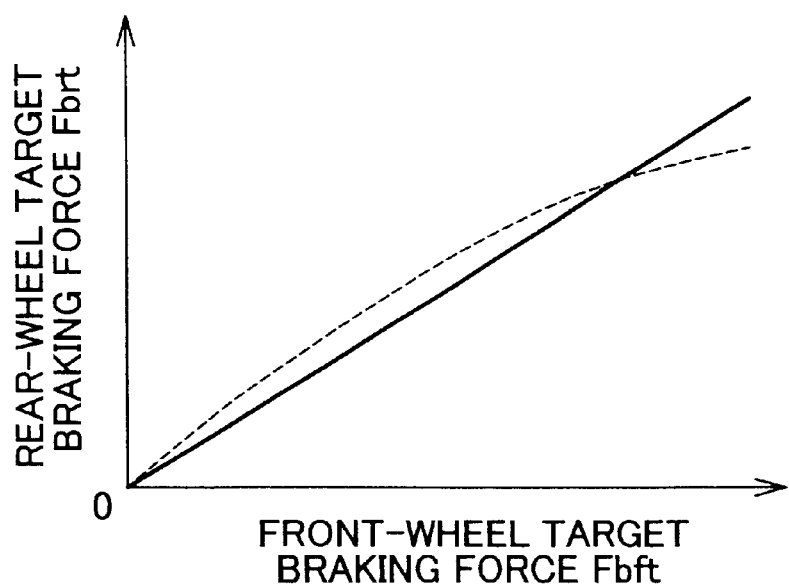
FIG. 7 is a graph showing the relationship between the target braking force Fbft of the front wheels and the target braking force Fbrt of the rear wheels.

While the ratio Kf/Kr of the braking force applied to the front wheels to the braking force applied to the rear wheels is constant with no regard to the magnitude of the target total braking force in the illustrated embodiment, the proportion Kr of the braking force of the rear wheels with respect to that of the front wheels may be reduced as the target total braking force increases, as indicated by a broken line in the graph of FIG. 7.

In the illustrated embodiment, signals indicative of the target regenerative braking forces and the actual regenerative braking forces of the front wheels and the rear wheels are transmitted between the engine control unit 28 and the braking control unit 52. This embodiment may be modified as follows. Initially, target regenerative braking torque is calculated based on the target regenerative braking force, and a signal indicative of the target regenerative braking torque is transmitted from the braking control unit 52 to the engine control unit 28, so that the engine control unit 28 controls regenerative braking, using the target regenerative braking torque as the upper limit. On the other hand, a signal indicative of the actual regenerative braking torque is transmitted from the engine control unit 28 to the braking control unit 52, and the actual regenerative braking force is calculated based on the actual regenerative braking torque received from the engine control unit 28.

In the illustrated embodiment, a driving system for driving the vehicle takes the form of the hybrid drive-train 10 including the gasoline engine 12 and the motor/generator 14, and the motor/generator 14 is operable as a generator for regenerative braking. However, the hybrid drive-train may include another type of internal combustion engine, such as a diesel engine. Also, the driving system for driving the vehicle may be a generally known internal combustion engine, and a generator for regenerative braking may be provided independently of the engine.

While the vehicle takes the form of a front-wheel-drive vehicle in the illustrated embodiment, the invention may be equally applied to a rear-wheel-drive vehicle or a four-wheel-drive vehicle. While the motor/generator 40 provided for the rear wheels functions solely as a generator for regenerative braking in the illustrated embodiment, the embodiment may be modified such that the rear-wheel motor/generator functions as an auxiliary drive source for driving the rear wheels as needed.

What is claimed is:

1. A braking force control apparatus of a motor vehicle including (a) first and second regenerative braking devices that are operable to effect regenerative braking with respect to front wheels and rear wheels, respectively, and (b) a friction braking device that is operable to effect friction braking with respect to each of the front wheels and the rear wheels, comprising:

a controller that:
calculates a first target braking force of the front wheels and a second target braking force of the rear wheels, based on a braking requirement made by a driver of the vehicle and a ratio of braking forces of the front wheels and the rear wheels; and
initially causes the first and second regenerative braking devices to generate regenerative braking forces at the front wheels and the rear wheels, and then, if necessary, causes the friction braking device to generate a friction braking force at each of the front wheels and rear wheels, so that a total braking force applied to the front wheels and a total braking force applied to the rear wheels are controlled to the first target braking force and the second target braking force, respectively.

2. A braking force control apparatus according to claim 1, wherein the controller:
determines a first maximum regenerative braking force that can be generated by the first regenerative braking device, and a second maximum regenerative braking force that can be generated by the second regenerative braking device;
sets a first target regenerative braking force to a smaller one of the first target braking force and the first maximum regenerative braking force, and sets a second target regenerative braking force to a smaller one of the second target braking force and the second maximum regenerative braking force; and
controls the first regenerative braking device for the front wheels so as to provide the first target regenerative braking force, and controls the second regenerative braking device for the rear wheels so as to provide the second target regenerative braking force.

3. A braking force control apparatus according to claim 2, wherein the controller:
determines a first actual regenerative braking force actually generated by the first regenerative braking device, and a second actual regenerative braking force actually generated by the second regenerative braking device;
sets a first target friction braking force of the front wheels to a value obtained by subtracting the first actual regenerative braking force from the first target braking force, and sets a second target friction braking force of the rear wheels to a value obtained by subtracting the second actual regenerative braking force from the second target braking force; and
controls the friction braking device for each of the front and rear wheels so as to provide the first target friction braking force and the second target friction braking force.

4. A braking force control apparatus according to claim 1, wherein:
the controller comprises a braking control unit and a regenerative braking control unit that transmit and receive information to and from each other; and the braking control unit controls the friction braking device so as to control braking pressures applied to the front and rear wheels, and controls the regenerative braking control unit so as to control the first and second regenerative braking devices.

5. A braking force control apparatus according to claim 4, wherein the braking control unit:

determines a first maximum regenerative braking force that can be generated by the first regenerative braking device, and a second maximum regenerative braking force that can be generated by the second regenerative braking device;

sets a first target regenerative braking force to a smaller one of the first target braking force and the first maximum regenerative braking force, and sets a second target regenerative braking force to a smaller one of the second target braking force and the second maximum regenerative braking force; and transmits signals indicative of the first target regenerative braking force and the second target regenerative braking force to the regenerative braking control unit, and the regenerative braking control unit controls the first regenerative braking device for the front wheels and the second regenerative braking device for the rear wheels so as to provide the first target regenerative braking force and the second target regenerative braking force.

6. A braking force control apparatus according to claim 5, wherein:

the regenerative braking control unit determines a first actual regenerative braking force actually generated by the first regenerative braking device, and a second actual regenerative braking force actually generated by the second regenerative braking device, and transmits signals indicative of the first and second actual regenerative braking forces to the braking control unit;

the braking control unit sets a first target friction braking force of the front wheels to a value obtained by subtracting the first actual regenerative braking force from the first target braking force, and sets a second target friction braking force of the second wheels to a value obtained by subtracting the second actual regenerative braking force from the second target braking force; and the braking control unit controls the friction braking device for each of the front and rear wheels so as to provide the first target friction braking force and the second target friction braking force.

7. A braking force control apparatus according to claim 4, wherein:

the vehicle is a hybrid vehicle including an internal combustion engine and a motor/generator that are operable to drive the vehicle, and a hybrid drive-train control unit that controls the internal combustion engine and the motor/generator;

at least one of the first and second regenerative braking devices comprises the motor/generator; and the regenerative braking control unit comprises the hybrid drive-train control unit.

8. A braking force control apparatus according to claim 1, wherein the vehicle is a hybrid vehicle including an internal combustion engine and a motor/generator that are operable to drive the vehicle, and wherein at least one of the first and second regenerative braking devices comprises the motor/generator.

9. A braking force control apparatus according to claim 1, wherein the vehicle is a front-wheel-drive vehicle, and wherein the first regenerative braking device for the front wheels comprises a motor/generator that is operable to drive the vehicle.

10. A braking force control apparatus according to claim 1, wherein the controller calculates a target deceleration of the motor vehicle based on the braking requirement made by the driver, so as to calculate the first target braking force of the front wheels and the second target braking force of the rear wheels.

11. A braking force control apparatus according to claim 10, wherein the friction braking device comprises a brake pedal, a master cylinder operatively connected to the brake pedal, and a hydraulic circuit that controls braking pressures applied to the front and rear wheels, and wherein the braking requirement is calculated based on at least one of an amount of depression of the brake pedal by the driver and a pressure of the master cylinder.

12. A braking force control apparatus according to claim 1, wherein the ratio of braking forces of the front wheels and the rear wheels is constant.

13. A method of controlling a braking force of a motor vehicle including (a) first and second regenerative braking devices that are operable to effect regenerative braking with respect to front wheels and rear wheels, respectively, and (b) a friction braking device that is operable to effect friction braking with respect to each of the front wheels and the rear wheels, the method comprising the steps of:

calculating a first target braking force of the front wheels and a second target braking force of the rear wheels, based on a braking requirement made by a driver of the vehicle and a ratio of braking forces of the front wheels and the rear wheels; and initially causing the first and second regenerative braking devices to generate regenerative braking forces at the front wheels and the rear wheels, and then, if necessary, causing the friction braking device to generate a friction braking force at each of the front wheels and the rear wheels, so that a total braking force applied to the front wheels and a total braking force applied to the rear wheels are controlled to the first target braking force and the second target braking force, respectively.

14. A method according to claim 13, further comprising:

determining a first maximum regenerative braking force that can be generated by the first regenerative braking device, and a second maximum regenerative braking force that can be generated by the second regenerative braking device;

setting a first target regenerative braking force to a smaller one of the first target braking force and the first maximum regenerative braking force, and setting a second target regenerative braking force to a smaller one of the second target braking force and the second maximum regenerative braking force; and controlling the first regenerative braking device for the front wheels so as to provide the first target regenerative braking force, and controlling the second regenerative braking device for the rear wheels so as to provide the second target regenerative braking force.

15. A method according to claim 14, further comprising:

determining a first actual regenerative braking force actually generated by the first regenerative braking device, and a second actual regenerative braking force actually generated by the second regenerative braking device;

setting a first target friction braking force of the front wheels to a value obtained by subtracting the first actual regenerative braking force from the first target braking force, and setting a second target friction braking force of the rear wheels to a value obtained by subtracting the second actual regenerative braking force from the second target braking force; and controlling the friction braking device for each of the front and rear wheels so as to provide the first target friction braking force and the second target friction braking force.

16. A method according to claim 13, wherein:

the vehicle includes a braking control unit and a regenerative braking control unit that transmit and receive information to and from each other; and the braking control unit controls the friction braking device so as to control braking pressures applied to the front and rear wheels, and controls the regenerative braking control unit so as to control the first and second regenerative braking devices.

17. A method according to claim 16, further comprising:

in the braking control unit, determining a first maximum regenerative braking force that can be generated by the first regenerative braking device, and a second maximum regenerative braking force that can be generated by the second regenerative braking device;

in the braking control unit, setting a first target regenerative braking force to a smaller one of the first target braking force and the first maximum regenerative braking force, and setting a second target regenerative braking force to a smaller one of the second target braking force and the second maximum regenerative braking force; and the braking control unit transmits signals indicative of the first target regenerative braking force and the second target regenerative braking force to the regenerative braking control unit, and the regenerative braking control unit controls the first regenerative braking device for the front wheels and the second regenerative braking device for the rear wheels so as to provide the first target regenerative braking force and the second target regenerative braking force.

18. A method according to claim 17, wherein:

in the regenerative braking control unit, determining a first actual regenerative braking force actually generated by the first regenerative braking device, and a second actual regenerative braking force actually generated by the second regenerative braking device, and transmitting signals indicative of the first and second actual regenerative braking forces to the braking control unit;

in the braking control unit, setting a first target friction braking force of the front wheels to a value obtained by subtracting the first actual regenerative braking force from the first target braking force, and setting a second target friction braking force of the second wheels to a value obtained by subtracting the second actual regenerative braking force from the second target braking force; and the braking control unit controls the friction braking device for each of the front and rear wheels so as to provide the first target friction braking force and the second target friction braking force.

19. A method according to claim 16, wherein:

the vehicle is a hybrid vehicle including an internal combustion engine and a motor/generator that are operable to drive the vehicle, and a hybrid drive-train control unit that controls the internal combustion engine and the motor/generator;

at least one of the first and second regenerative braking devices comprises the motor/generator; and the regenerative braking control unit comprises the hybrid drive-train control unit.

20. A method according to claim 13, wherein the vehicle is a hybrid vehicle including an internal combustion engine and a motor/generator that are operable to drive the vehicle, and wherein at least one of the first and second regenerative braking devices comprises the motor/generator.

21. A method according to claim 13, wherein the vehicle is a front-wheel-drive vehicle, and wherein the first regenerative braking device for the front wheels comprises a motor/generator that is operable to drive the vehicle.

22. A method according to claim 13, further comprising calculating a target deceleration of the motor vehicle based on the braking requirement made by the driver, so as to calculate the first target braking force of the front wheels and the second target braking force of the rear wheels.

23. A method according to claim 22, wherein the friction braking device comprises a brake pedal, a master cylinder operatively connected to the brake pedal, and a hydraulic circuit that controls braking pressures applied to the front and rear wheels, and wherein the braking requirement is calculated based on at least one of an amount of depression of the brake pedal by the driver and a pressure of the master cylinder.

24. A method according to claim 13, wherein the ratio of braking forces of the front wheels and the rear wheels is constant.

* * * * *